No. 762,438. PATENTED JUNE 14, 1904.
J. H. PITKIN.
SELF FEEDER FOR CORN HUSKERS AND SHREDDERS.
APPLICATION FILED DEC. 26, 1903.
NO MODEL. 3 SHEETS—SHEET 3.
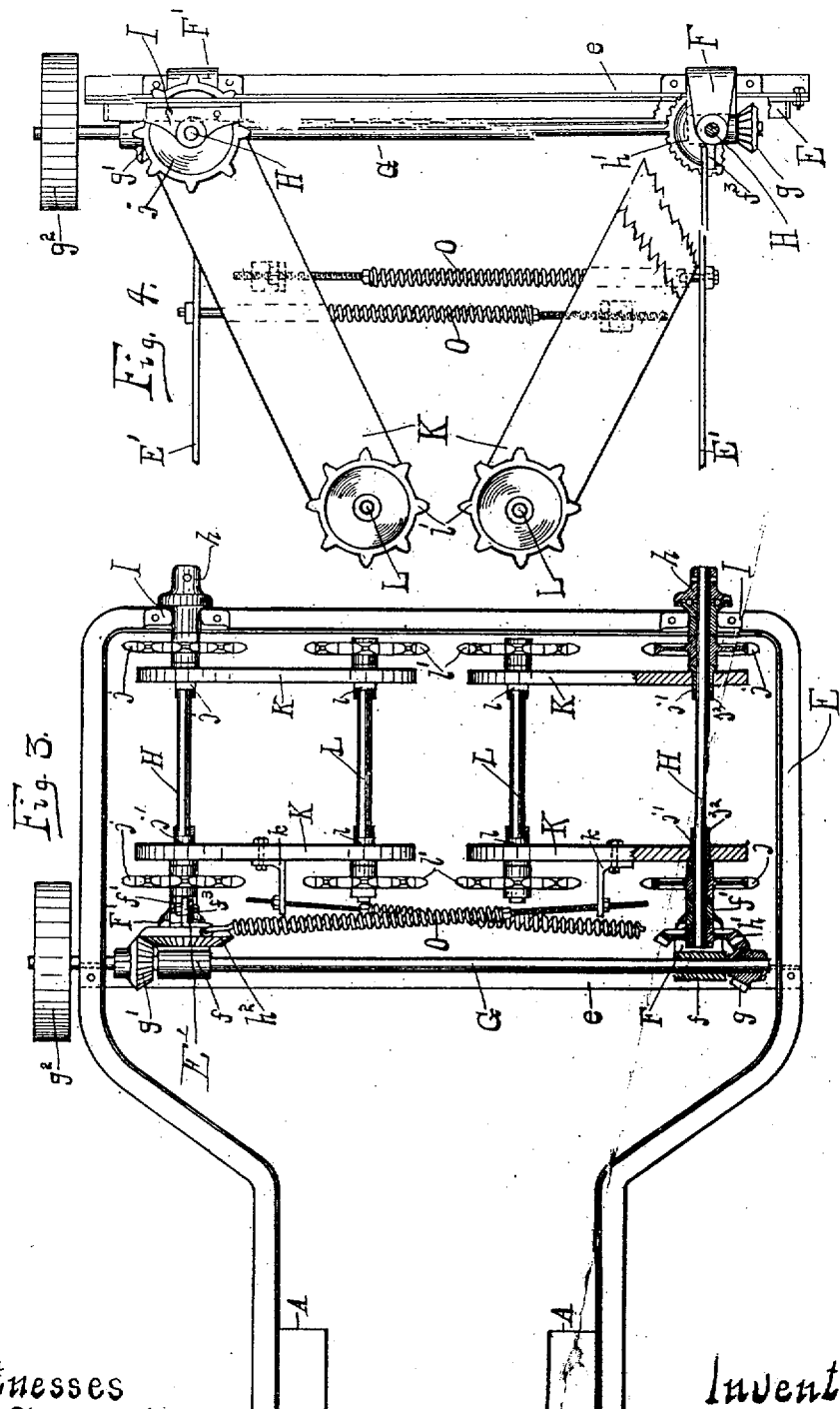
Witnesses
J. N. Daggett.
T. H. Alfreds
Inventor
Julian H. Pitkin.
BY J. C. Warner
Atty.

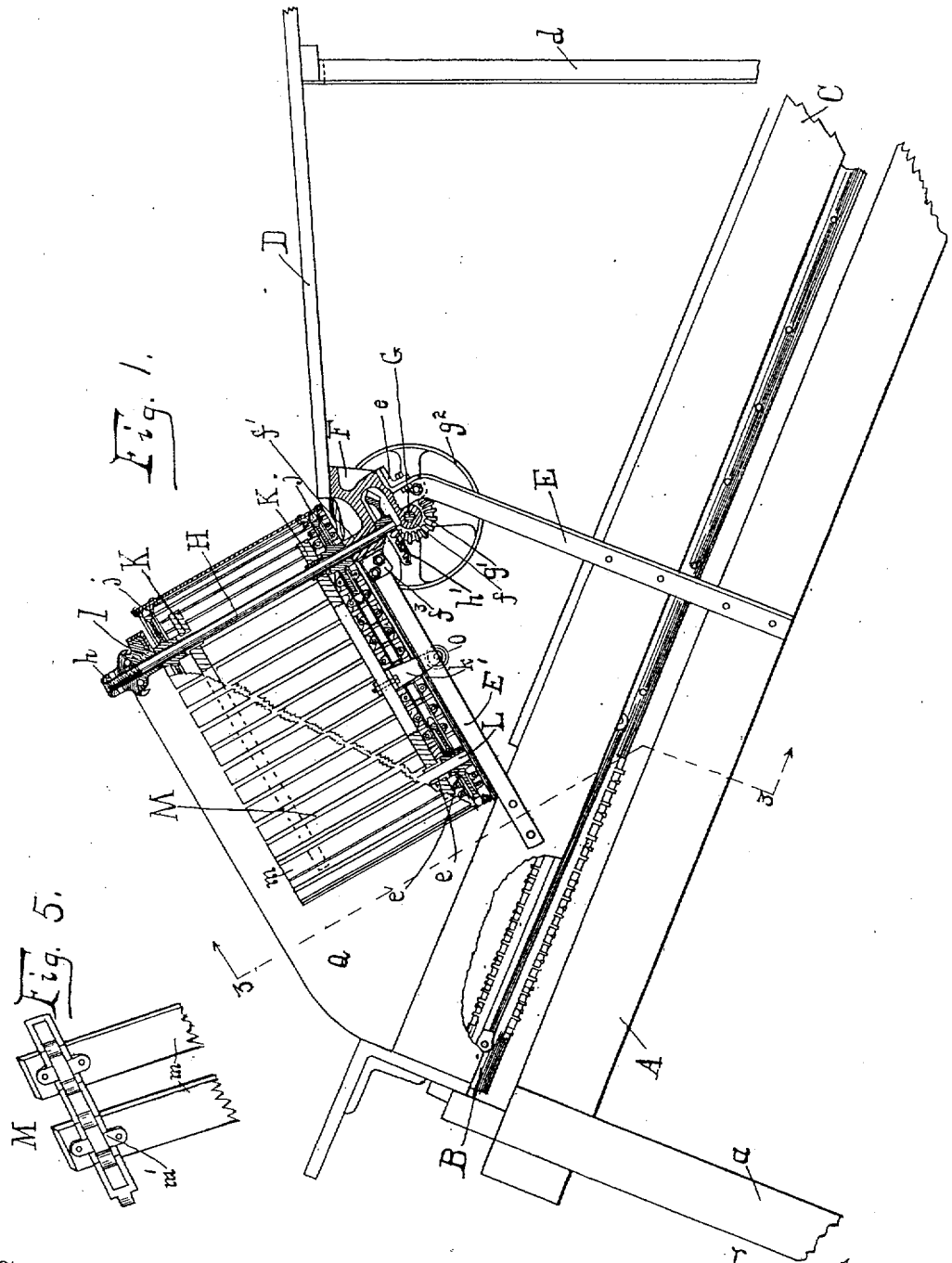

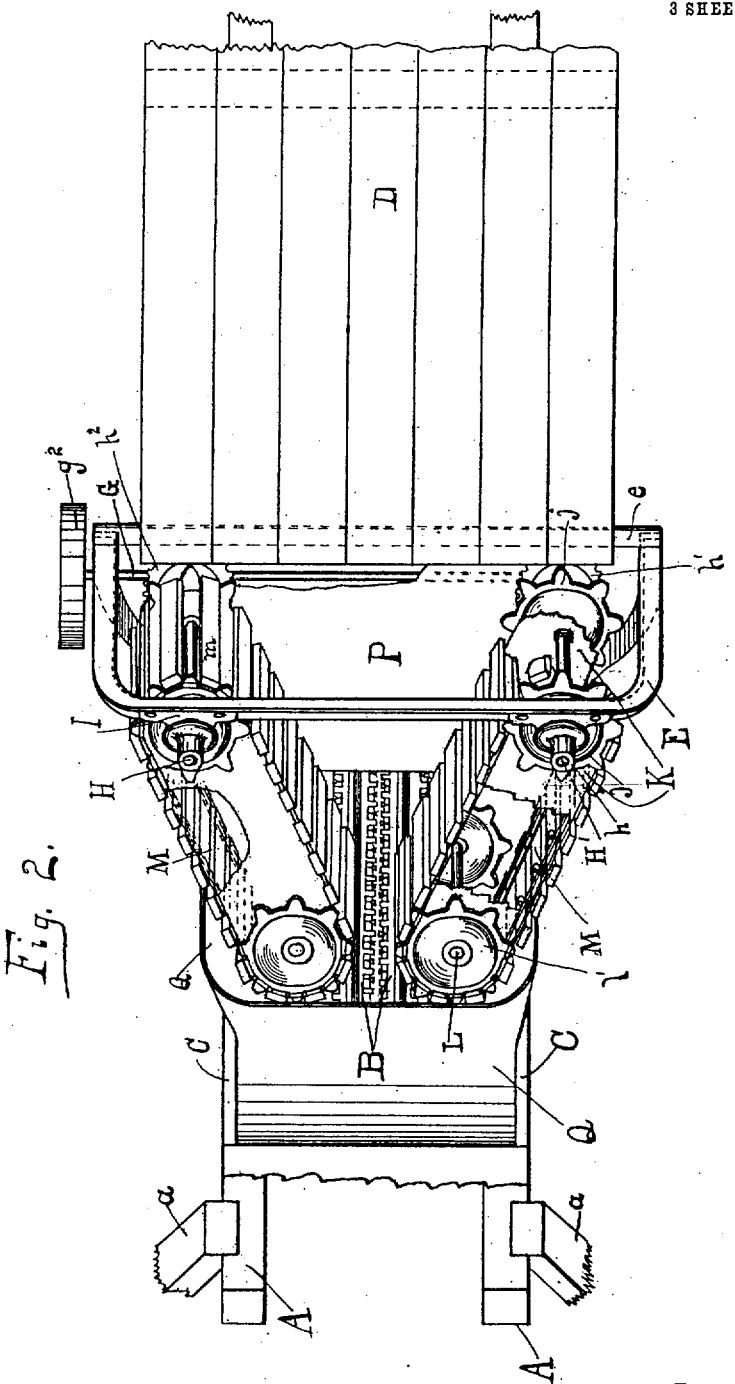

No. 762,438.

Patented June 14, 1904.

UNITED STATES PATENT OFFICE.

JULIAN H. PITKIN, OF CHICAGO, ILLINOIS, ASSIGNOR TO INTERNATIONAL HARVESTER COMPANY, A CORPORATION OF NEW JERSEY.

SELF-FEEDER FOR CORN HUSKERS AND SHREDDERS.

SPECIFICATION forming part of Letters Patent No. 762,438, dated June 14, 1904.

Application filed December 26, 1903. Serial No. 186,717. (No model.)

*To all whom it may concern:*

Be it known that I, JULIAN H. PITKIN, a citizen of the United States, residing at Chicago, in the county of Cook and State of Illinois, have invented a new and useful Improvement in Self-Feeders for Corn Huskers and Shredders, of which the following is a complete specification.

The object of this invention is to provide simple and effective means for automatically presenting the stalks of corn to the snapping and husking rolls of a corn husking and shredding machine.

In the drawings, Figure 1 represents a side elevation of a portion of a corn husker and shredder embodying my improvement, one of the endless conveyers being shown partly broken away to more clearly set forth the construction of same. Fig. 2 is a corresponding plan view of the parts shown in Fig. 1 with a portion of one of the endless conveyers and the supporting-frame shown broken away. Fig. 3 is an end elevation of the frame and driving mechanism of the feeding apparatus as it would appear in the section indicated by the line 3 3 of Fig. 1. Fig. 4 is a plan view of the parts shown in Fig. 3; and Fig. 5 is a fragmentary perspective of the endless conveyer, showing the construction of same.

On the type of shredder in connection with which this invention is shown the snapping and husking rolls are substantially longitudinal of the machine, in consequence of which the endless conveyers, arranged in vertical planes, as set forth in the drawings, will present the corn in a swath the width of which will extend lengthwise of the said rolls. In presenting the stalks of corn in this way it is apparent that the effectiveness of the machine will be greatly increased.

In connection with the following description wherever the term "snapping and husking roll" is used it is intended to cover single rolls, the upper ends of which snap the ears from the stalk, while the lower end operates to remove the husks from the ears.

Referring to the drawings, A designates the main upper side sills of a corn husker and shredder, only a portion thereof being shown, and *a* the forward oblique supports for same.

B represents the snapping and husking rolls mounted in suitable bearings (not shown) between the sills A, and C C are the side boards, forming, in effect, a hopper over the said rolls.

D is the platform or table for receiving the material to be operated upon previous to being fed into the machine, and *d* is the support for the rear end of same.

Secured to and extending upwardly from the sills A and the side boards C is the U-shaped frame E, swelled out at its upper portion to form a support for the frames of the endless conveyers. This U-shaped frame is constructed, preferably, of angle-iron, the upper part of the frame being deflected forwardly to accommodate the angularly-disposed endless conveyers mounted thereon. Near the point of flexure on this frame is secured the transversely-extending tie *e*, preferably an angle also. To this tie *e* are secured the two brackets F F', which form bearings for the driving-shafts of the endless conveyers and on which rests the forward end of the feeding-table D. The construction of these brackets is clearly shown in Figs. 1, 3, and 4, Fig. 1 showing a section of F or the one nearest the observer, the section being taken longitudinal of the machine, so that the transverse driving-shaft G is shown in section and the bevel-pinion *g* on this side removed. Fig. 3 shows a section of the bracket F and an elevation of F' transverse of the machine and longitudinal of the driving-shaft G, while in Fig. 4 is shown a plan view of same. *f f* and *f' f'* are bosses integral with said bracket and which afford support and bearing for the cross or driving shaft G and the two vertically-disposed shafts H and H', respectively. Extending forwardly from the bosses *f'* are the lugs *f³*, to which are secured the braces E', extending to and connecting with the side boards C. In this way a rigid support is formed for the endless conveyers, as well as the feeding-table. The upper ends of the shafts H and H' are supported in bearings in the brackets I I, as shown in the several figures, the said brackets being secured to the upper transverse part of the frame E. On the upper side of these brackets I are formed races for balls, and secured to the upper end of the shafts H and H' are the caps $h$, with corresponding ball-races, thus forming an antifriction-bearing to take the end thrust on said shafts caused by the weight of the conveyers themselves. On the lower ends of the shafts H and H' are secured the bevel-gears $h'$ and $h^2$, which mesh with and are driven by the bevel-pinions $g$ and $g'$, respectively, on the driving-shaft G. On the projecting end of the shaft G is secured the driving-pulley $g^2$, through which power is transmitted from any convenient source.

On the vertically-disposed shafts H and H' intermediate of their supporting-bearing are rigidly secured the sprocket-wheels $j$, and between the said sprocket-wheels and adjacent to the hubs thereof are loosely sleeved the collars $j''$. On these collars $j''$ fit the arms or boards K, of a width a little less than the diameter of the sprocket-wheels $j$. These arms or boards K are mounted in pairs, two on each shaft, are independent of the rotation of the shafts, and the two arms of each pair occupy positions vertically coincident, so that the lower or free ends are free to swing about the shaft on which they are mounted as a center. $j^2$ are collars secured to said shafts to keep the arms or boards K in proper position.

At the lower or free ends of the boards K in the collars $l$ are mounted the shafts L L, parallel with the shafts H and H', and on the upper and lower ends of these shafts are secured the sprocket-wheels $l'$ in the same plane as the sprocket-wheels $j$. About these sprocket-wheels $l'$ and the sprocket-wheels $j$ pass the endless conveyers M. These endless conveyers consist of a series of slats $m$, attached to a special form of sprocket-chain $m'$, as clearly indicated in the fragmentary detail shown in Fig. 5. The arms K being of substantially the diameter of the sprocket-wheels serve as guides to prevent the said conveyer from being deflected inwardly when in operation. To press the endless conveyer-belts M toward each other and against the material passing between them, counteracting tension-springs O are interposed between the frame of each endless conveyer M and a fixed part of the frame, preferably to the braces E'. To locate the said spring in a non-interfering position with respect to the conveyer, brackets $k$ are secured to and project downwardly from the lower arms K of the feeder-frame, to which the said springs connect.

Extending from the forward end of the table D, adjacent to the lower end of the conveyer-belts M and to the side boards C, is the plate P, forming the bottom of the stalk passage-way for the material passing from the feed-table to the husking-rolls, a portion of the upper side thereof being cut away to show the driving-shaft G. The sides of the stalk passage-way are formed by the endless conveyer-belts M, and while the said passage-way above is shown open the hood Q may be made to extend far enough toward the feed-table to inclose the same. The lower ends of these endless conveyers converge laterally and are made by the springs O movable laterally, thus forming a converging and laterally-yielding stalk passage-way.

The operation of the device is apparent. The cornstalks are moved forward on the table by the operator until they are engaged by the slatted conveyer-belts M. These conveyer-belts converging at their lower and free ends and being held in yielding contact with each other the cornstalks will be pressed laterally by the free ends and forced downward and forward to the snapping and husking rolls B. These endless conveyers operating in substantially a vertical plane will form the stalks into a web or swath, the breadth of which will lie in a plane longitudinal of the machine and parallel with the said rolls, and thus in a form well adapted to be received by them.

What I claim as my invention, and desire to secure by Letters Patent, is—

1. In a corn husker and shredder, in combination, a feed-table, snapping and husking rolls, a plate which inclines from said feed-table to said snapping and husking rolls, and forms the bottom of the stalk passage-way, endless conveyers forming the sides of the stalk passage-way said conveyers arranged in planes substantially perpendicular to said bottom on either side thereof and converging downwardly, the lower or free ends of the conveyers being laterally movable and yieldingly held both with respect to each other and with respect to the bottom of the stalk passage-way.

2. In a corn husker and shredder, in combination, a feed-table, snapping and husking rolls, a plate which inclines from the said feed-table to the said snapping and husking rolls and forms the bottom of the stalk passage-way, a U-shaped frame extending upwardly from the frame of the machine above the upper end of the stalk passage-way and substantially at right angles to the bottom thereof, two parallel fixed shafts mounted on said frame and on either side thereof, two vertically-coincident arms vibratably mounted upon each of said shafts, laterally-movable shafts parallel to the above-mentioned shafts mounted in the free ends of said arms, sprocket-wheels in alinement secured to said fixed and movable shafts, endless conveyers passing around said sprocket-wheels and constituting the sides of the stalk passage-way, a transverse shaft beneath the upper end of the said stalk passage-way and adjacent to the lower ends of the said fixed shafts, suitable gearings connecting said fixed shafts and the transverse shaft and means for holding the free ends of said vibratile arms in yielding relation with respect to each other, substantially as described.

3. In a corn husker and shredder, in combination, a feed-table, snapping and husking rolls, a plate which inclines from the said feed-table to the said snapping and husking rolls and forms the bottom of the stalk passage-way, a U-shaped frame extending upwardly from the frame of the machine above the upper end of the stalk passage-way and substantially at right angles to the bottom thereof, two parallel fixed shafts mounted on said frame and on either side thereof, two vertically-coincident arms vibratably mounted upon each of said shafts, laterally-movable shafts parallel to the above-mentioned shafts mounted in the free ends of said arms, sprocket-wheels in alinement secured to said fixed and movable shafts, endless conveyers passing around said sprocket-wheels and constituting the sides of the stalk passage-way, a transverse shaft beneath the upper end of the said stalk passage-way and adjacent to the lower ends of the said fixed shafts, suitable gearings connecting said fixed shafts and the transverse shaft and a spring interposed between each of said vibratile arms intermediate of the length thereof and a fixed part of the frame of the machine, substantially as described.

JULIAN H. PITKIN.

In presence of—
J. C. WARNES,
T. N. DAGGETT.